United States Patent
Budecker et al.

Patent Number: 5,096,400
Date of Patent: Mar. 17, 1992

[54] HYDRAULIC PUMP

[75] Inventors: Ludwig Budecker, Frankfurt am Main; Anton David, Goetzenhain; Georg Obersteiner, Koenigstein; Hans-A. Guse, Bad Homburg; Ulrich Zutt, Niedernhausen; Bernd Schweighoefer, Schmitten, all of Fed. Rep. of Germany

[73] Assignee: Alfred Teves GmbH, Frankfurt am Main, Fed. Rep. of Germany

[21] Appl. No.: 572,994
[22] PCT Filed: Nov. 10, 1989
[86] PCT No.: PCT/EP89/01342
 § 371 Date: Aug. 10, 1990
 § 102(e) Date: Aug. 10, 1990
[87] PCT Pub. No.: WO90/07060
 PCT Pub. Date: Jun. 28, 1990

[30] Foreign Application Priority Data

Dec. 17, 1988 [DE] Fed. Rep. of Germany ....... 3842602
Apr. 20, 1989 [DE] Fed. Rep. of Germany ....... 3912937

[51] Int. Cl.⁵ .............................................. F04B 11/00
[52] U.S. Cl. ..................................... 417/540; 417/542
[58] Field of Search ................................. 417/540, 542

[56] References Cited

U.S. PATENT DOCUMENTS 3,366,067 4/1966 Kocolowski .................. 417/540
4,721,444 1/1988 Pareja .

FOREIGN PATENT DOCUMENTS 2357790 11/1973 Fed. Rep. of Germany ...... 417/540
3044082 6/1982 Fed. Rep. of Germany .

Primary Examiner—Richard A. Bertsch
Assistant Examiner—Charles G. Freay
Attorney, Agent, or Firm—Robert P. Seitter; J. Gordon Lewis

[57] ABSTRACT

A hydraulic pump which is furnished with a bushing-type closing element (11) for the purpose of damping pulsations of pressure and of the delivery flow. The closing element (11) turns the delivery flow several times and contains a damping chamber. An optimum adjustment of the damping device is possible by varying the external diameter of the end portion (12) of the closing element (11) and by varying the reach of screw of the closing element (11).

32 Claims, 4 Drawing Sheets

HYDRAULIC PUMP

TECHNICAL FIELD

The present invention is related to a damping device for hydraulic positive-displacement pumps.

BACKGROUND OF THE INVENTION

Due to the intermittent drive of the recuperator piston, hydraulic positive-displacement pumps generate pressure pulsations which, create undesirable noise.

Such pumps serve, for example, for the hydraulic fluid supply of hydraulic brake units or of hydraulic power steering assemblies in automotive vehicles. The damping device serves to reduce pulsations of the pressure and of the delivery flow. Damping devices are employed both for the purpose of noise reduction and to avoid pressure surges in the system to be operated. A pump of this kind is known from German published patent application No. 32 09 296, the damping device being, however, configurated in the shape of an additional damping chamber requiring considerable space and including a housing of its own with guiding devices incorporated therein.

In another prior-art positive-displacement pump (German printed and examined patent application No. 15 28 359) an elastic element enclosing a gas volume is positioned both in the range of the suction connection and in the range of the delivery connection for damping of the pressure pulsation. Although suction-side pressure pulsations can be damped in a satisfactory manner by the use of an enclosed compressible gas cushion since the pressure pulsations take place at a very low pressure level, no appreciable damping of pulsations can be achieved by the disclosed arrangement in the delivery range, in particular as far as high pressure pumps are concerned, since the gas cushion loses its damping capacity very rapidly as the pressure rises.

SUMMARY OF THE INVENTION

It is, therefore, the object of the invention to provide a hydraulic pump of the kind mentioned above which features a simple and compact design and simultaneously guarantees a particularly low pressure pulsation, being, at the same time, distinguished by a particularly sturdy design.

This object is attained in a preferred embodiment of the present invention, in which the duct is connected to the annular chamber square with the blind-end bore. A sharp deviation of the delivery flow is achieved in this manner, as a result whereof the degree of damping is increased. A further deviation of the hydraulic fluid flow is attained in that the outlet openings are routed radially out of the closing element toward the outside.

A further improvement of the damping quality is achieved in that the outlet openings end up in a collecting chamber positioned in the cylinder block. In one embodiment of the invention offering particular ease of mounting the annular chamber and the collecting chamber are divided from each other by the screw coupling of the closing element. A decisive improvement of the damping is achieved when an elastic element is positioned between the outlet valve and the pump outlet. In this manner, a pulsation damping is obtained by the elastic deformation of an elastomeric shaped element which protrudes into a cavity under the effect of pressure. Besides the compressibility of the elastomer, the property of absorbing energy of deformation is utilized.

This characteristic of the damping device can be varied by the particular shape of the elastomeric element or by the contour of the rigid wall which is preferably located at the pump housing or at a closing element being associated with the pump housing.

Depending on the desired elastic, and corresponding damping properties, the cavity may contain an enclosed volume of air or may be connected to the ambient air by means of an atmosphere bore.

The damping characteristic cam be influenced in an especially effective way when a spring element is placed between the shaped element and the rigid wall. The effect of the pressure chamber acting as a damping chamber can be increased when a restriction point is provided between the delivery-side connection and the pressure chamber. That restriction point may be placed in the valve housing of a non-return valve being positioned between the power chamber and the pressure chamber. In this context, the restriction point is if possible designed in such a way that a deviation of the delivery flow takes place on its way from the power chamber to the delivery-side connection.

According to an especially advantageous embodiment of the invention, the damping device is provided as a completely pre-assembled integrated module which includes the pressure chamber, the shaped element, the rigid wall, the spring element, the restriction point, and the non-return valve. Further advantageous features and functions of the present invention will be revealed by the following description of embodiments of the invention made with reference to the accompanying drawing, in which:

DETAILED DESCRIPTION OF THE INVENTION

Figure 1:
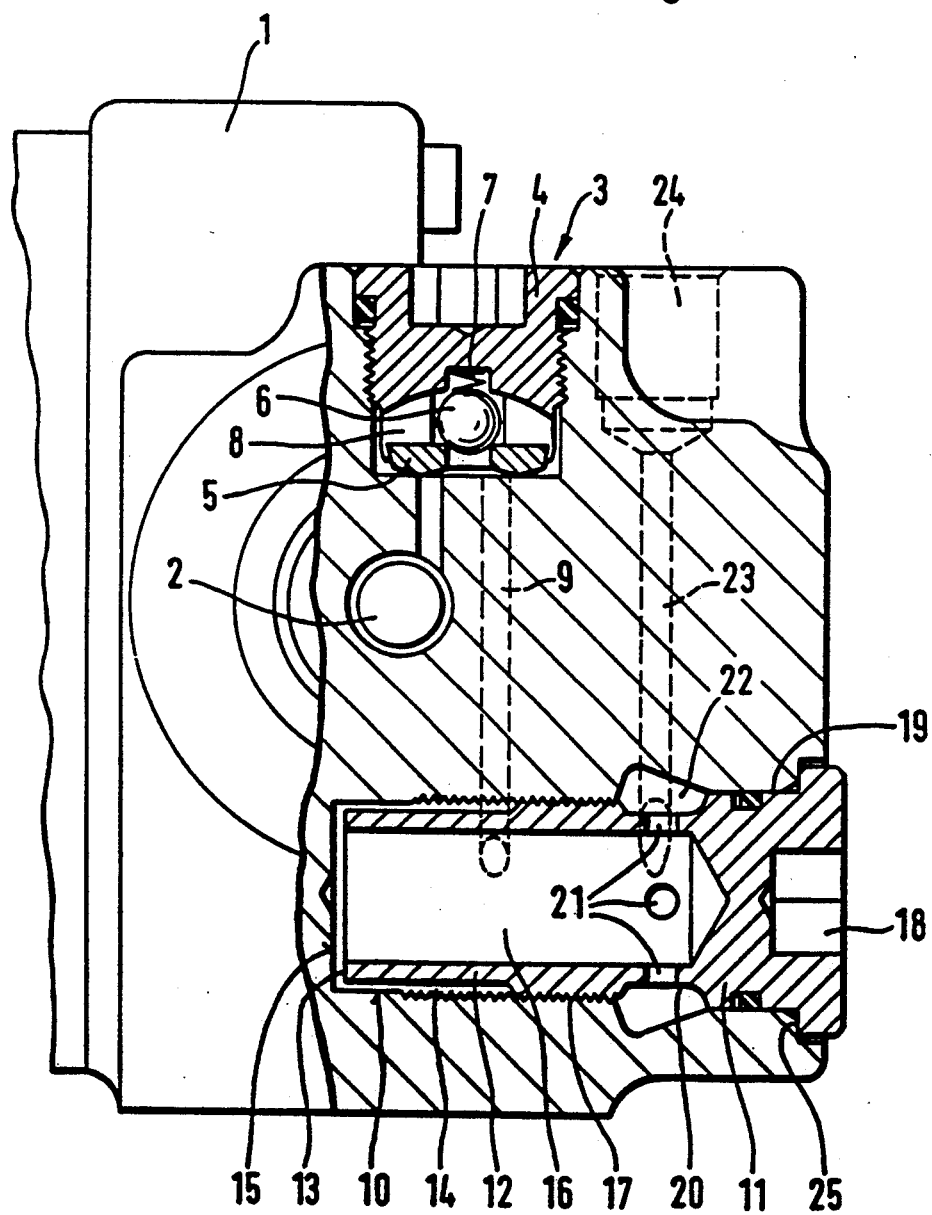
FIG. 1 shows a first embodiment of a hydraulic pump according to the invention, in which the damping device is illustrated.

FIG. 1 shows one embodiment of the invention in the shape of a dual-circuit radial piston pump, the power pistons 2 being driven by an eccentric which is not shown in the drawing. Power pistons 2 operate in the cylinder block 1. The power chamber of each piston is connected to an outlet valve 3 which is secured in the cylinder block 1 by a screw coupling. Outlet valve 3 is in the shape of a non-return valve and includes of the valve body 4, the valve seat 5, the closing member 6, and the valve spring 7. To the outlet-side valve chamber 8 of outlet valve 3, a duct 9 integrated in the cylinder block 1 is connected which ends in a blind-end bore 10 whose longitudinal axis extends square with the said duct 9.

Into the blind-end bore 10, the closing element 11 is screwed whose end portion covering the point of connection of the duct is set off in diameter. In this way, an annular chamber 14 is formed in the range of the point of connection of the duct 9. The front side 13 of said end portion 12 has a defined distance from the bottom 15 of the blind-end bore 10, as a result whereof a damping gap is formed. By an axially extending recess in the shape of a central blind-end bore a damping chamber 16 is formed in the closing element 11 being open in the direction of the front side 13 and connected to the damping chamber 14. Roughly in the middle of its axial extension, closing element 11 is furnished with a threaded portion 17 at its periphery. The end of the closing element 11 positioned opposite the front side is an extended head-type and is provided with a hexagonal recess 18. The range 19 succeeding the head portion is furnished with a circular groove to accommodate a seal.

The portion 20 which is positioned between the threaded portion 17 and the range 19 of the closing element 11 has a slightly constricted diameter and is provided with radial outlet openings 21. Outlet openings 21 connect the damping chamber 16 to a collecting chamber 22 which is formed by a circumferential radial extension of the blind-end bore 10. A connection 23 leading to the pump outlet 24 is linked to the collecting chamber 22. If the pump is furnished with a plurality of outlets, then it will be possible to let further connections branch off from the collecting chamber 22.

During operation of the pump, hydraulic fluid is conveyed upon each power stroke of the power pistons 2 through the outlet valve 3 and the duct 9 into the annular chamber 14, where the flow of hydraulic fluid is turned and restricted. This is the first stage for damping of the pulsations of pressure and of the hydraulic fluid flow. When it passes over from the annular chamber 14 into the damping chamber 16, the hydraulic fluid is turned and restricted once more in the damping gap. A further turn in flow occurs when it enters the collecting chamber 22 through the outlet openings 21. The pump outlet connection 23 may be directly integrated in the closing element 11.

The damping of the flow of hydraulic fluid can meet specific requirements by adjusting the difference between the external diameter of the end portion 12 and the diameter of the blind-end bore 10. Damping requirements can also be met by varying the size of the damping gap existing between the front side 13 and the bottom 15 of the blind-end bore. This may, for example, be carried out by placing shim plates between the cylinder block 1 and the abutment surface 25 of the head-shaped portion of the closing element 11.

Figure 2:
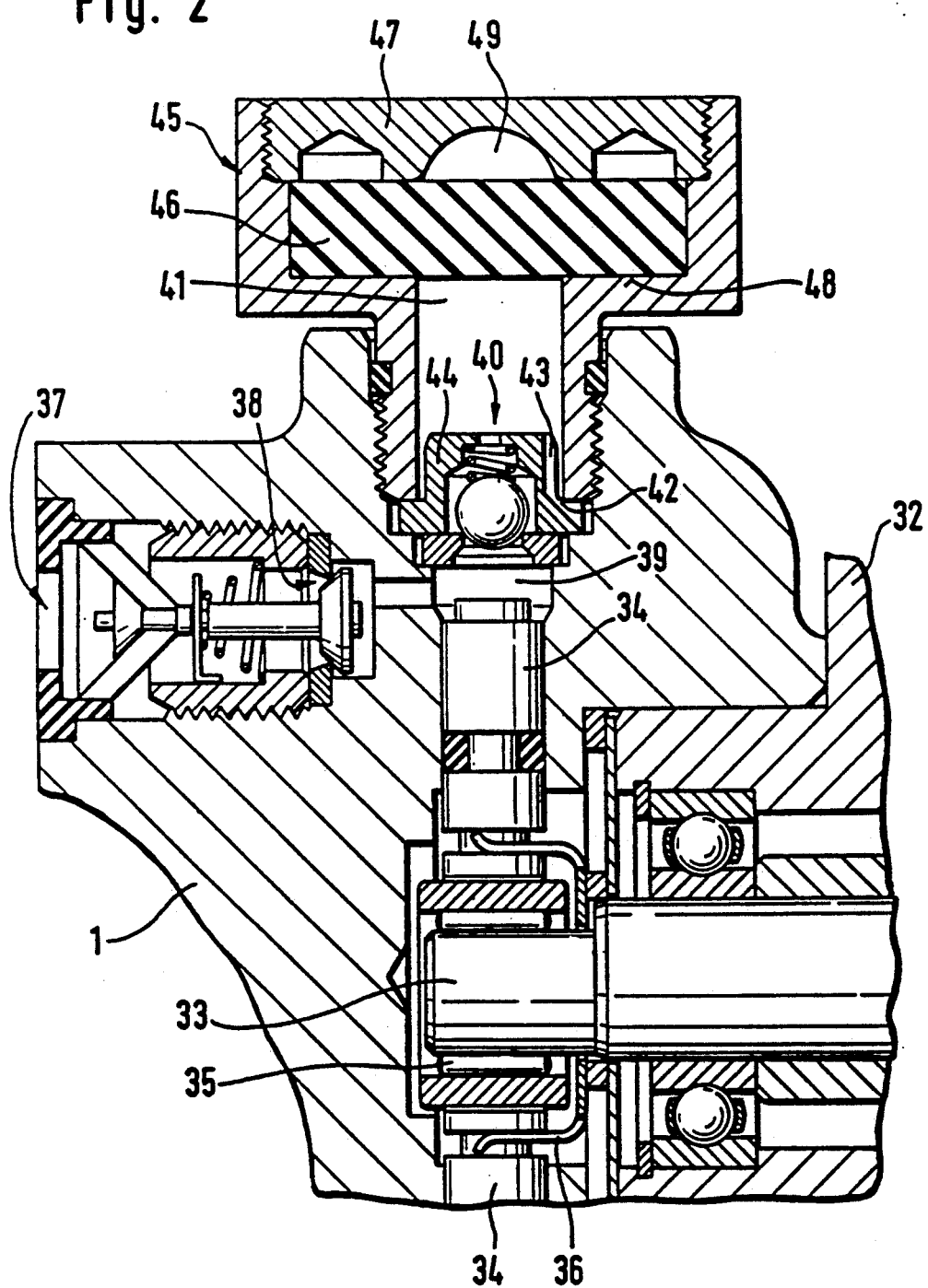
FIG. 2 shows a second embodiment of the invention.

FIG. 2 is a cross-section illustration of a radial piston pump including a cylinder block 1 in which the housing 32 of an electric motor (not shown in the drawing) is accommodated whose driven shaft is furnished with an eccentric 33 serving to drive the power pistons 34. Power pistons 34 are supported on the eccentric 33 through a roller bearing 35, the return stroke is assured by a coupling ring 36 through which the two power pistons are connected to each other. With separate axial extensions, the coupling ring engages a circular groove positioned on each power piston 34.

The pump receives hydraulic fluid through the suction-side connection 37 and the suction valve 38 into the power chamber 39 in order to convey it through the pressure valve 40 into the pressure chamber 41 upon a counterstroke. The pressure chamber 41 is connected to the pressure-side connection (not shown in the drawing) through the restriction point 42. Restriction point 42 is formed by the notch 43 in the valve housing 44 of the pressure valve 40. Pressure valve 40 is a spring, non-return valve with a ball-shaped valve closing element and pressed-in valve seat ring and fixed by the closing element 45 which can be screwed into the cylinder block 1.

Closing element 45 encloses the pressure chamber 41 and the elastomeric element 46 which is pressure-tightly pressed against an annular abutment surface 48 by the cover 47 of the closing element 45.

The pressure peaks occurring in the pressure chamber 41 during operation of the pump cause, besides a certain compression of the elastomeric element 46, a deformation by which the elastomeric element 46 projects into the cavity 49 formed in the cover lid 47.

Figure 3:
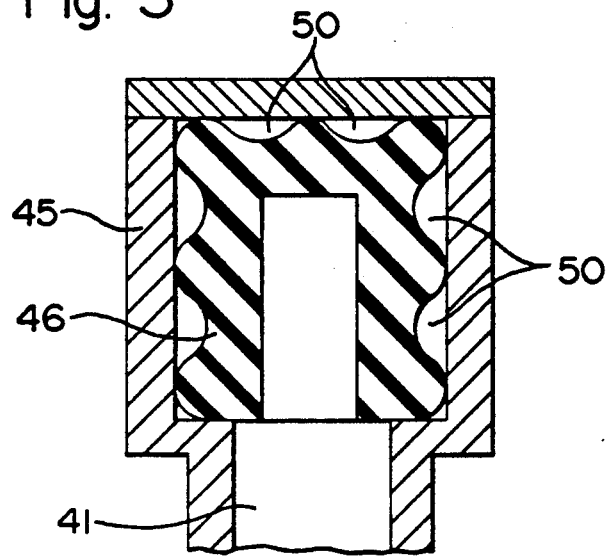
FIG. 3 shows a special embodiment of the damping device shown in FIG. 2.

FIG. 3 shows an embodiment of the elastomeric element 46 in which cavities are formed by recesses 50 in the element 46. In this embodiment, the additional tooling of the closing element 45 which leads to higher manufacturing costs, can be eliminated. The recesses 50 in the element 46 may, for example, be formed in the shape of peripheral, circular grooves or as hemispheres. The embodiment shown in FIG. 3 shows a cup-shaped elastomeric element 46, which permits the pressure chamber 41 to have a particularly compact design since the ratio between the volume of the elastomeric element 46 and the surface to be pressurized is favorable.

Figure 4:
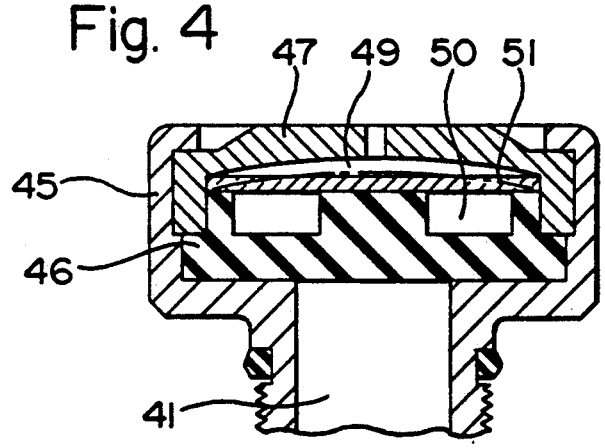
FIG. 4 shows another special embodiment of the damping device shown in FIG. 2.

FIG. 4 shows an embodiment of the invention in which a spring element 51 is positioned in the cavity 49 for an improved damping characteristic. The elastomeric element 46 is fixed in the closing element 45 by the cover 47 which is secured by a mortise. The elastomeric element 46 is provided with a plurality of recesses 50 and is abutted, on its side facing away from the pressure chamber 41, spring element 51. Spring element 51 may be an elastic plate. As an alternative, another spring element, for example a cup spring, could be used. By an appropriate correlation of the spring rates of the spring 51 and of the elastomeric element 46, a constant spring characteristic over the total pressure range can be achieved and the influence of temperature becomes negligible. By an appropriate adjustment the spring element 51 is deformed only when the elastomeric element 46 has reached the limit of its deforming capacity. The head of the closing element 45 is designed in the shape of a hexagon, which allows it to be screwed onto the cylinder block using a simple tool. The cavity 49 is connected to the ambient through an atmosphere bore, so that the enclosed volume of air does not obstruct the deformation of the elastomeric shaped element 46 or of the spring element 51. Just as in the other embodiments the pressure chamber 41 is sealed by the elastomeric element 46 with respect to the housing, so that no hydraulic fluid may enter into the cavities 49, or, respectively into the recesses 50.

Figure 5:
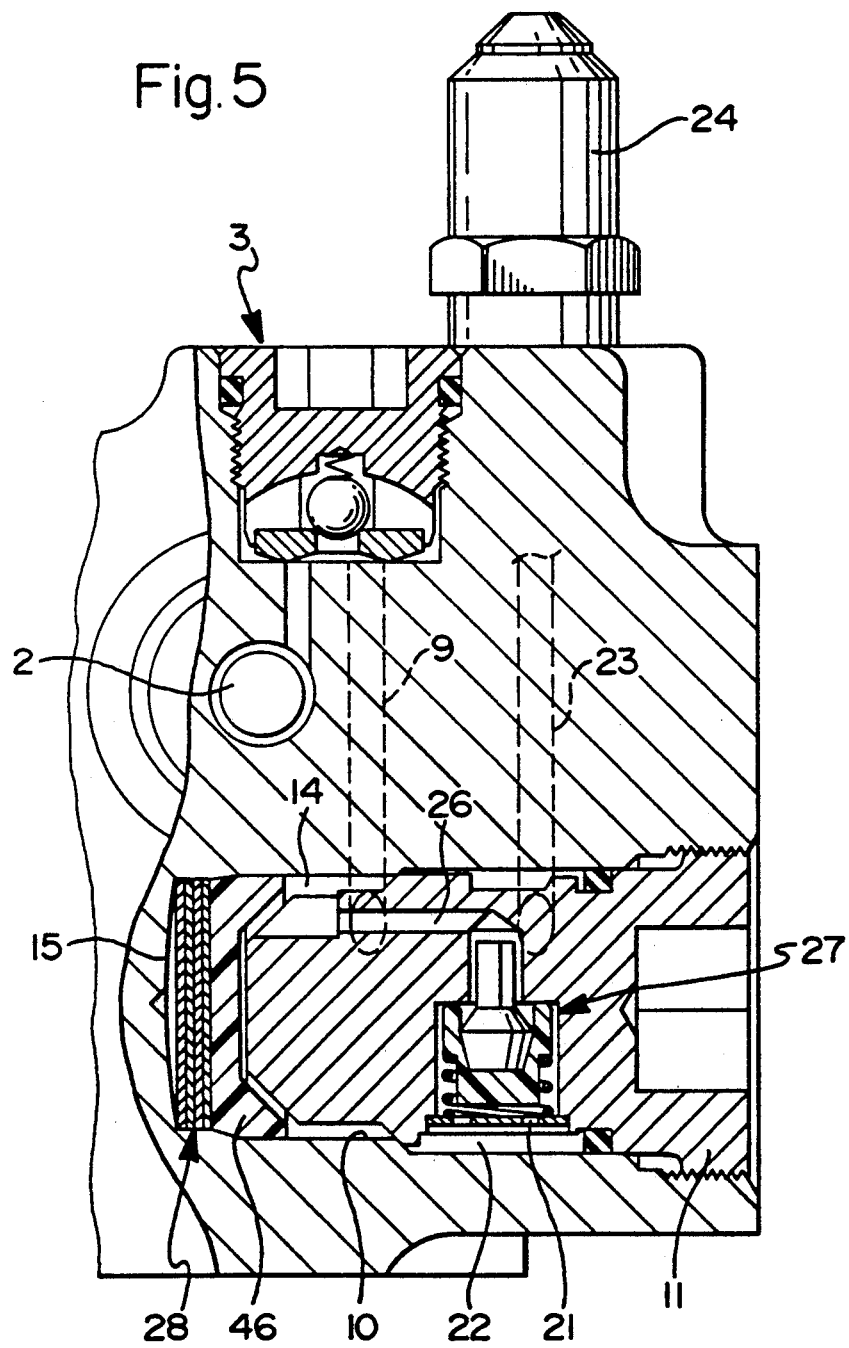
FIG. 5 shows still another embodiment in accordance with the invention.

FIG. 5 shows a cross-sectional view of a radial piston pump whose design corresponds largely to that of the radial piston pump shown in FIG. 1. Elements corresponding to each other have, indeed, been given identical reference numerals. The piston 2 of the radial piston pump delivers fluid through the outlet valve 3 into the duct 9 which is connected to the annular chamber 14. Annular chamber 14 is formed by the closing element 11 projecting into the blind-end bore 10. Closing element 11 is furnished with a duct 26 connecting the annular chamber 14 to the outlet opening 21. Outlet opening 21 leads to the collecting chamber 22 which has a ring-shaped configuration and is divided from the annular chamber 14 by a collar of the closing element 11.

A connection 23 leads from the collecting chamber 22 to the pump outlet 24. A spring-loaded, non-return valve 27 is positioned in the duct 26 which blocks the direction of flow from the collecting chamber 22 to the annular chamber 14.

The non-return valve 27 prevents the elasticity of the elastomeric element 46 which defines the annular chamber 14 from affecting the power circuit connected to the pump outlet 24. The elastomeric element 46 is arranged between the closing element 11 and the bottom 15 of the blind-end bore 10. It has a cup-shaped configuration and is abutted, on its front side facing away from the annular chamber 14, against a stack of discs 28 which serves as a spring element in order to adapt the damping of the pressure pulsations to the ruling operating pressures.

According to FIG. 5, the damping of the pressure pulsations and, thus, the noise reduction are achieved both by deviation of the delivery flow and by deformation of the elastic element. The fluid flow passes, in addition, through chambers featuring different volumes.

We claim:

1. A hydraulic pump comprising:
   (a) a cylinder block having:
      (1) a power chamber,
      (2) a blind-end bore having a closed end, and
      (3) a duct having a first end opening into said blind-end bore;
   (b) a power piston within said power chamber;
   (c) an outlet valve mounted to said cylinder block and connected to said power chamber, said outlet valve having an outlet side into which a second end of said duct opens; and
   (d) a closing element having:
      (1) an end portion projecting into said blind-end bore and forming an annular chamber within said blind-end bore at said first end of said duct, a front side of said end portion spaced axially from said closed end of said blind-end bore, and
      (2) a damping chamber opening in the direction of said front side of said end portion of said closing element, and
      (3) an outlet opening from said damping chamber spaced from said front side of said end portion of said closing element.

2. A hydraulic pump as claimed in claim 1 wherein said blind-end bore has a longitudinal axis and said duct is connected to said annular chamber formed in said blind-end bore perpendicularly to said longitudinal axis of said bore.

3. A hydraulic pump as claimed in claim 1 wherein said outlet opening from said damping chamber spaced from said front side of said end portion of said closing element extends radially out of said closing element.

4. A hydraulic pump as claimed in claim 3 further comprising a collecting chamber formed in said cylinder block and connected to the end of said outlet opening which extends radially out of said closing element.

5. A hydraulic pump as claimed in claim 4 further comprising a screw coupling between said closing element and the wall of said blind-end bore, said screw coupling allowing said closing element to enter and exit said bore and separating said annular chamber of said bore from said collecting chamber.

6. A hydraulic pump as claimed in claim 5 wherein said screw coupling includes a thread disposed along said wall of said blind-end bore extending nearly to said closed end of said bore and having a diameter slightly larger than the outer diameter of said end portion of said closing element.

7. A hydraulic pump as claimed in claim 1 further comprising an elastic damping means for damping pressure pulsations positioned between said outlet valve in said cylinder block and the outlet of said hydraulic pump.

8. A hydraulic pump as claimed in claim 7 wherein said elastic damping means is positioned between said front side of said end portion of said closing element and said closed end of said blind-end bore.

9. A hydraulic pump as claimed in claim 8 wherein said closed end and the wall of said blind-end bore form a rigid member and said elastic damping means and said rigid member are adapted to form a cavity between said elastic damping means and said rigid member.

10. A hydraulic pump as claimed in claim 9 wherein said cavity is formed by a recess in said elastic member.

11. A hydraulic pump as claimed in claim 9 wherein said cavity is formed by a recess in said rigid member.

12. A hydraulic pump as claimed in claim 9 wherein said elastic damping means seals said cavity from said annular chamber, thereby preventing the hydraulic fluid in said hydraulic pump from entering said cavity.

13. A hydraulic pump as claimed in claim 9 wherein said cavity opens to the atmosphere.

14. A hydraulic pump as claimed in claim 9 further comprising a spring element positioned between said elastic damping means and said rigid member.

15. A hydraulic pump as claimed in claim 14 wherein said spring element is embedded in said elastic damping means.

16. A hydraulic pump as claimed in claim 14 wherein said spring element is prestressed.

17. A hydraulic pump as claimed in claim 9 further comprising a spring element positioned between said elastic damping means and said annular chamber.

18. A hydraulic pump as claimed in claim 17 wherein said spring element is prestressed.

19. A hydraulic pump for conveying hydraulic fluid comprising:
   a suction-side connection for receiving said hydraulic fluid;
   a pressure chamber having a delivery-side connection for delivering said hydraulic fluid and a non-return valve;
   a power chamber connected to said suction-side connection and through said non-return valve to said pressure chamber and in which a piston operates to convey said hydraulic fluid from said suction-side connection through said non-return valve into said pressure chamber;
   a rigid housing including a cover and a closing element and enclosing said pressure chamber; and
   an elastomeric element positioned in said pressure chamber and having a recess adapted, along with said rigid housing, to form a cavity between said elastomeric element and said rigid housing.

20. A hydraulic pump as claimed in claim 19 wherein said elastomeric element seals said cavity from said pressure chamber, thereby preventing said hydraulic fluid from entering said cavity.

21. A hydraulic pump for conveying hydraulic fluid comprising:
   a suction-side connection for receiving said hydraulic fluid;

a pressure chamber having a delivery-side connection for delivering said hydraulic fluid and a non-return valve;

a power chamber connected to said suction-side connection and through said non-return valve to said pressure chamber and in which a piston operates to convey said hydraulic fluid from said suction-side connection through said non-return valve into said pressure chamber;

a rigid housing including a cover and a closing element and enclosing said pressure chamber; and an elastomeric element positioned in said pressure chamber and adapted, along with said rigid housing, to form a cavity with opens to the atmosphere between said elastomeric element and said rigid housing.

22. A hydraulic pump as claimed in claim 21 wherein said cavity is formed by a recess in said rigid housing.

23. A hydraulic pump as claimed in claim 21 wherein said elastomeric element seals said cavity from said pressure chamber, thereby preventing said hydraulic fluid from entering said cavity.

24. A hydraulic pump for conveying hydraulic fluid comprising:

a suction-side connection for receiving said hydraulic fluid;

a pressure chamber having a delivery-side connection for delivering said hydraulic fluid and a non-return valve;

a power chamber connected to said suction-side connection and through said non-return valve to said pressure chamber and in which a piston operates to convey said hydraulic fluid from said suction-side connection through said non-return valve into said pressure chamber;

a rigid housing including a cover and a closing element and enclosing said pressure chamber;

an elastomeric element positioned in said pressure chamber to dampen pulsations in said hydraulic fluid and adapted, along with said rigid housing, to form a cavity between said elastomeric element and said rigid housing; and a spring element positioned between said elastomeric element and said rigid housing for improved damping of said hydraulic fluid.

25. A hydraulic pump as claimed in claim 24 wherein said pressure chamber, said elastomeric element, said rigid housing, said spring element, and said non-return valve are formed as a pre-assembled integrated module.

26. A hydraulic pump as claimed in claim 24 wherein said spring element is embedded in said elastomeric element.

27. A hydraulic pump as claimed in claim 24 wherein said spring element is prestressed.

28. A hydraulic pump for conveying hydraulic fluid comprising:

a suction-side connection for receiving said hydraulic fluid;

a pressure chamber having a delivery-side connection for delivering said hydraulic fluid and a non-return valve;

a power chamber connected to said suction-side connection and through said non-return valve to said pressure chamber and in which a piston operates to convey said hydraulic fluid from said suction-side connection through said non-return valve into said pressure chamber;

a rigid housing including a cover and a closing element and enclosing said pressure chamber;

an elastomeric element positioned in said pressure chamber and adapted, along with said rigid housing, to form a cavity between said elastomeric element and said rigid housing; and a spring element positioned between said elastomeric element and said pressure chamber.

29. A hydraulic pump as claimed in claim 28 wherein said pressure chamber, said elastomeric element, said rigid housing, said spring element, and said non-return valve are formed as a pre-assembled integrated module.

30. A hydraulic pump as claimed in claim 28 wherein said spring element is prestressed.

31. A hydraulic pump for conveying hydraulic fluid comprising:

a suction-side connection for receiving said hydraulic fluid;

a pressure chamber having a delivery-side connection for delivering said hydraulic fluid and a non-return valve;

a restriction point positioned between said pressure chamber and said delivery-side connection;

a power chamber connected to said suction-side connection and through said non-return valve to said pressure chamber and in which a piston operates to convey said hydraulic fluid from said suction-side connection through said non-return valve into said pressure chamber;

a rigid housing including a cover and a closing element and enclosing said pressure chamber; and an elastomeric element positioned in said pressure chamber and adapted, along with said rigid housing, to form a cavity between said elastomeric element and said rigid housing.

32. A hydraulic pump as claimed in claim 31 wherein said non-return valve of said pressure chamber, positioned between said power chamber and said pressure chamber, has a valve housing and said restriction point is formed in said valve housing.

* * * * *